United States Patent [19]
McMurtry et al.

[11] 3,825,370
[45] July 23, 1974

[54] PITCH VARYING MECHANISM FOR VARIABLE PITCH FAN

[75] Inventors: David Roberts McMurtry; Michael John Agg, both of Bristol, England

[73] Assignee: Rolls-Royce (1971) Limited, London, England

[22] Filed: Dec. 6, 1972

[21] Appl. No.: 312,754

[30] Foreign Application Priority Data
Dec. 11, 1971   Great Britain .................... 57658/71

[52] U.S. Cl. ................................. 416/160, 416/152
[51] Int. Cl. ........................................... B64c 11/32
[58] Field of Search ........................... 416/152, 160

[56] References Cited
UNITED STATES PATENTS

| | | | |
|---|---|---|---|
| 2,370,675 | 3/1945 | McCoy | 416/160 |
| 2,460,559 | 2/1949 | Wildhaber | 416/160 UX |
| 2,620,887 | 12/1952 | Tiedeman et al. | 416/160 X |
| 3,647,320 | 3/1972 | Chilman et al. | 416/160 X |
| 3,672,788 | 6/1972 | Ellinger | 416/152 X |

FOREIGN PATENTS OR APPLICATIONS

| | | | |
|---|---|---|---|
| 772,115 | 8/1934 | France | 416/160 |

OTHER PUBLICATIONS

French, 1st Addition Pat. No. 47,646 to Waseige, Mar. 1937, 416-152.

*Primary Examiner*—Everette A. Powell, Jr.
*Attorney, Agent, or Firm*—Stevens, Davis, Miller & Mosher

[57] ABSTRACT

The blades of a variable pitch fan of a gas turbine engine are rotated about their longitudinal axes as well as about the axis of the engine by a gear system which comprises a stationary actuator which initiates the pitch varying movement by producing a rotary output corresponding to the degree of pitch change required, an epicyclic differential gear driven by this output and the engine main shaft, and arranged to produce an output corresponding to the sum of the rotary output and the shaft rotational speed, and a pitch changing gear adapted to be driven by the output of the differential gear and to produce relative rotation of two annulus gears connected to rotate the fan blades about their own axes.

7 Claims, 3 Drawing Figures

PITCH VARYING MECHANISM FOR VARIABLE PITCH FAN

The present invention relates to pitch varying mechanisms for variable pitch fans, and has particular but not exclusive reference to such mechanisms for use in gas turbine engines.

A variable pitch fan in this specification means a fan, the blades of which are rotatable about their longitudinal axes to vary their angles of attack.

The pitch varying mechanisms for variable pitch fan engines have been developed from the principles successfully used in variable pitch propeller technology. The mechanisms so produced have been hydraulic mechanisms and have tended to become relatively complex and heavy and it has become desirable to develop the lighter less complex mechanisms if the benefits offered by variable pitch fan engines are not to be out-weighed by the additional weight and cost of the mechanisms they require for their operation.

An object of the present invention is to produce a relatively light-weight gear train for effecting the variation in pitch of the blades of a variable pitch fan.

According to the present invention a pitch varying mechanism for the blades of a variable pitch fan comprises a shaft driving a rotor on which the fan blades are mounted, and is characterized by an actuator which is stationary relative to the rotor and which is capable of producing a rotational output corresponding to the degree of pitch change required in the blades, an epicyclic differential gear arranged to be driven by said output and adapted to produce an output corresponding to the sum of the shaft rotational speed and the actuator output, a pitch changing gear, adapted to be driven by the output from the differential gear, and to produce rotation of means connected to the fan blades to rotate them about their longitudinal axes to produce said degree of pitch change.

The pitch changing gear may take the form of a gear having one or more planet wheels driven by a sun wheel and meshing with a pair of surrounding annulus gears having different numbers of teeth.

In a preferred form of the invention, the epicyclic differential gear includes a cage for supporting the planet wheels such that the teeth of the alternate planet wheels are axially offset and mesh with two different sun and annulus gears. One of the gear trains has the annulus "earthed" to static structure and the sun wheel driven by the shaft. This is a first input and defines the speed of the cage. The other train has its annulus static or rotatable at a speed dictated by the input from the actuator, and the sun wheel rotates at shaft speed plus actuator speed. This is the output.

In a preferred embodiment of the invention the pitch changing gear is an epicyclic gear having one or more planet wheels carried in a cage, the or each of which meshes with two annulus gears with different numbers of teeth. This may be achieved by making the two annulus gears mesh with the planet or planets at different pitch circle diameters and different pressure angles.

A further preferred feature of the pitch changing gear is that the planet wheels all have teeth overhung from the bearing at one axial end for meshing with the sun wheel. By this means the cage can be made as a one-piece annular member of open channel section, and the web of the channel as a complete cylinder with no slots in it.

An example of the present invention will now be described in more detail with reference to the accompanying drawings wherein.

Figure 1:
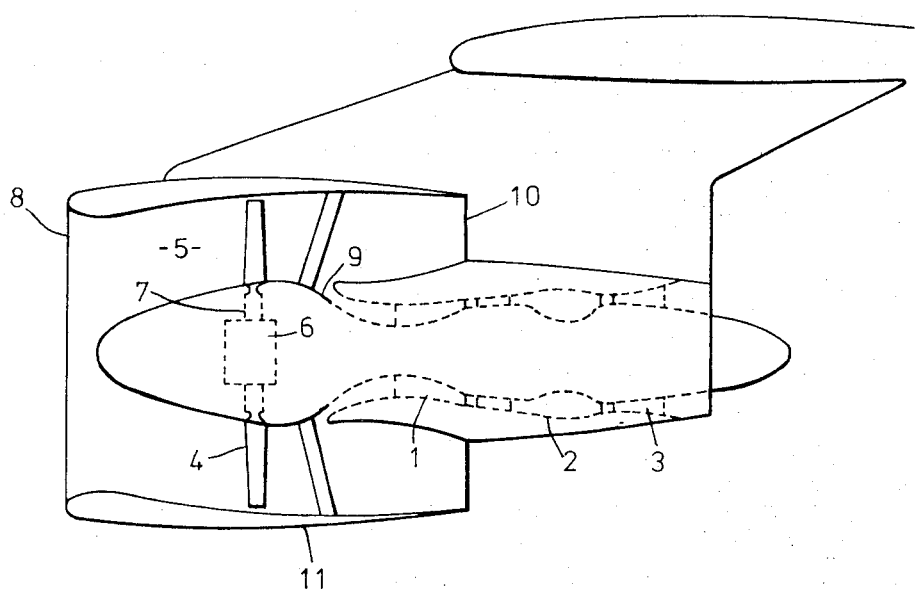
FIG. 1 is a diagrammatic view of a variable pitch fan gas turbine engine.

Referring now to the drawings, in FIG. 1 there is shown a ducted fan gas turbine engine comprising a core engine having compressor means 1, combustion equipment 2, and turbine means 3 all in flow series, and a fan 4, disposed in annular duct 5. The fan is driven by means of a gear box 6 from the core engine, and the individual blades of the fan are rotatable about their longitudinal axes from a forward thrust-producing position to a reverse thrust-producing position by means of a pitch varying mechanism 7. In the forward-thrust producing position of the fan, air enters the duct through an inlet 8 and part of it flows into the core engine via core engine inlet 9, while the remainder passes to atmosphere through an exhaust nozzle 10.

Figure 2:
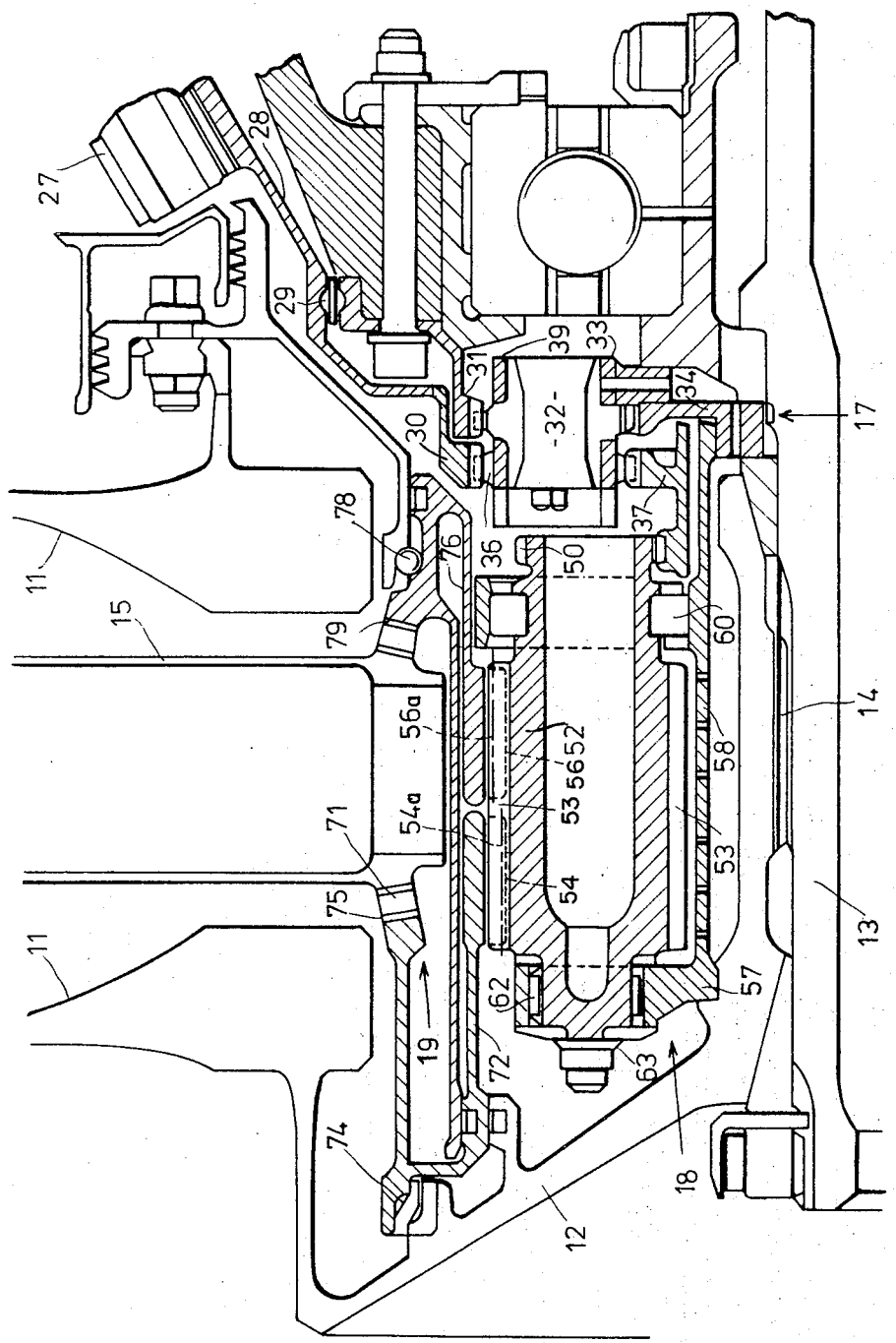
FIG. 2 is a section through the variable pitch fan engine of FIG. 1 showing the pitch changing mechanism.

Referring now to FIG. 2, the fan blades (not shown) are mounted on a rotor disc 11, which is driven through a drive cone 12 from the engine main shaft 13 via a splined connection 14. A torque tube 15 is rotatable about its own longitudinal axis to vary the pitch setting of the blades, and rotates with the disc 11.

Figure 3:
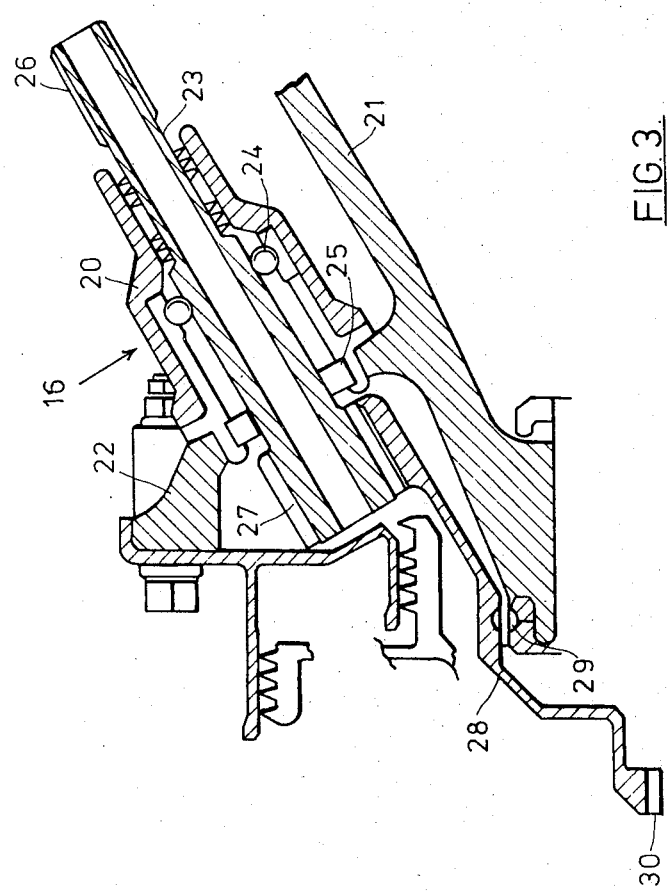
FIG. 3 is a section through the input drive from the motor to the mechanism of FIG. 2.

In FIGS. 2 and 3 the pitch varying mechanism 7 can be seen in more detail, and comprises four parts, (1) an actuator 16, (2) an epicyclic differential gear 17, (3) a pitch changing gear 18 and (4) a fan bevel gear 19. All four parts operate in series to convert an output from a drive motor (not shown), operated for example from a pilot's lever in an aircraft on which the engine is mounted, to movement of the fan blades to change their pitch.

1, THE ACTUATOR (Fig. 3)

This part consists of a body 20, mounted on the exterior of the fan bearing support 21, by means of a mounting flange 22 which also acts as a sump for oil draining from the mechanism. The actuator is thus stationary relative to the fan rotor. A shaft 23 is mounted for rotation in the body by means of bearings 24 and 25. At one end the shaft 23 has splines 26 for connection to the drive motor, and at the other end has a bevel gear 27 for meshing with a corresponding bevel on a conical drive shaft 28, which is supported in a bearing 29. The bevel gears are arranged to give a speed reduction of approximately 17:1. The shaft 28 carries an annular toothed wheel 30 which forms part of one of the epicyclic trains of the epicyclic differential gear.

The actuator being fixed to the engine casing does not rotate so that the toothed wheel 30 is effectively earthed unless the shaft 28 is rotated by virtue of an input from the drive motor. The actuator and the drive motor which operates the mechanism are all mounted externally of the engine giving easy access for maintenance purposes.

2, THE EPICYCLIC DIFFERENTIAL GEAR

This gear includes two gear trains. One of the trains comprises an annulus gear 31 earthed to static structure, and meshing with a plurality of planet wheels 32 carried in a cage 33, and which mesh in turn with a sun wheel 34 splined to the engine main shaft 13.

The other of the trains, which is slightly axially displaced from the first train, comprises the annulus gear 30 which meshes with another row of identical planets 36 carried by the same cage 33. The planets 36 mesh in turn with a second freely rotatable sun wheel 37, which is arranged to mesh in turn with teeth 50 of a gear on the planets of the pitch changing gear.

The planets are supported by plain bearing surfaces 39 on the cage and the cage is split along its transverse center line and bolted up between the planets.

The operation of the differential gear is as follows:

a. In the steady state condition, i.e., when there is no input from the input gear, both annulus gears are effectively earthed. The main shaft drives the sun wheel 34, and the cage with both groups of planets rotates about the engine shaft with an angular velocity approximately half that of the shaft, the sun wheel 37 rotating at shaft speed.

b. When an input is fed from the actuator to the annulus gear 30. Since the speed of the cage is already defined by the planets 32 meshing between annulus 31 and sun 34, the input has the effect of speeding up or slowing down the rotation of the planet wheels 36 about their own axes, and this effect is transmitted to the sun wheel 37. The increase or decrease in speed of the sun wheel 37 is superimposed on the steady state condition described above, and acts as an input to the pitch changing gear. The proportions of the elements of the epicyclic gear give a speed increase between the annulus 30 and the sun wheel 37 of the order of 4/3.

3, THE PITCH CHANGING GEAR

This consists basically of the sun wheel 37, a plurality of planet wheels 52, and the annulus gears 54 and 56 which provide outputs to the fan bevel gear.

The planet wheels are held in a cage 57 which is made in the form of an annular member having a channel section and wherein the open side of the channel faces radially outwardly. This construction of cage provides strength in the cage, and is achieved by positioning the teeth 50 on the end of the planets so that they are overhung from the bearing 60. This enables the cage to be made in one piece with no slots in the web 58 of the channel section.

An additional feature of the pitch changing gear construction is that although the two annulus gears 54 and 56 have different numbers of teeth, the teeth 53 of the planet wheel extend continuously from one end of the planet to the other. This means that they can be ground accurately in one operation. The meshing with the two annulus gears is achieved by using different pitch circle diameters 54a and 56a respectively and allowing the teeth to mesh at different pressure angles. In fact, in the example illustrated eight planets are provided and there are eight more teeth on annulus gear 54 than on annulus gear 56.

The planets gear are supported on roller bearings 60 at one end and needle roller bearings 62 at the other end and are retained by a nut 63. The net bearing load, from the centrifugal loads and tooth loads, is approximately tangential to the cage.

The operation of the pitch changing gear is as follows:

a. In the steady state, the fan rotor and blades are rotated by the main shaft 13 via splines 14 and drive cone 12. The torque tube 15 is carried round by the rotor and this drives the whole pitch changing gear assembly at shaft speed. Since the sun wheel 37 is driven at shaft speed by the differential gear during steady state running, there is no rotation of any of the parts of the pitch changing gear relative to the shaft and therefore no load tending to rotate the fan blades.

b. When an input is fed in to the sun wheel 37 via the epicyclic differential gear, the sun wheel 37 rotates at a greater or lesser speed than the shaft. The effect of this is to turn the planet wheels 52 on their own axes, and because these mesh with annulus gears with different numbers of teeth, relative rotation is produced between the two annulus gears to drive the fan blades around on their own axes. The torque tubes 15 can only rotate on their own axes because they are fixed to the fan blades. The numbers of teeth, and the proportions of the elements of the pitch changing gear are such as to produce a speed reduction of 58 : 1 between the sun wheel 37 and the annulus gears 54 and 56.

4, THE FAN BEVEL GEAR

The fan blades are rotated by the torque tube 15 which has at its radially inner end a fan bevel gear 71. The annulus gear 54 has a cylindrical extension 72 extending axially therefrom, which is supported in a bearing 72, and which carries a bevel gear 75 for meshing on one side with the fan bevel gear 71. Similarly the annulus gear 56 has a cylindrical extension 76 which is supported in a bearing 78 and which carries a bevel gear 79 which meshes on the opposite side with fan bevel gear 71. Thus relative rotation of the annulus gears 54 and 56 causes relative rotation of the bevel gears 75 and 79 to which they are connected. Because these bevel gears mesh on opposite sides of the fan bevel gears 71, this relative rotation causes rotation of the torque tubes and hence the fan blades.

There is in fact a step up gear ratio between the pitch changing gear and the fan bevel gear of approximately 5 which reduces the overall reduction between the actuator and bevel gear, but with the embodiment thus described an overall reduction of approximately 142 : 1 can be achieved.

The overall system is, therefore, robust and lightweight and because the power is transmitted at all stages through gearing, the mechanism also provides a feedback signal to indicate the angular position of the fan blades at any instant. The actuating motor is controlled by a servo mechanism (not shown) which receives the feedback signal and controls the motor actuation accordingly.

With the gear drive of the present invention the problem of feeding a pitch change signal from a static structure, i.e., the pilots lever, to the rotating system of the fan rotor is overcome.

Clearly, variations in the elements of the mechanism may be employed without departing from the scope of the appended claims. For example the number of planet wheels in the pitch changing gear may be different from the number quoted above. The number of teeth and proportions of the elements of the various gear trains may be changed to give optimum gear ratios for minimum weight with maximum strength.

The mechanism may be constructed so as to be a self-contained module, except for the actuator, with its own oil supply, thus necessitating a re-positioning of the various seals and bearings.

1. A pitch varying mechanism for a variable pitch fan in which a plurality of fan blades are mounted on a rotor and a rotational shaft is provided for driving the rotor and wherein the mechanism comprises in combination:
- an actuator which is mounted stationary relative to the rotor and which is operable to produce a rotational output corresponding to the degree of pitch change required in the blades;
- an epicyclic differential gear having two input gears one of which is driven by the shaft and the other of which is driven by said rotational output, and having an output corresponding to the sum of the shaft rotational speed and the actuator rotational output;
- a pitch changing reduction gear having a pair of output gears and an input, the input corresponding to the output of the epicyclic differential gear, the output from the pitch changing reduction gear being in the form of relative rotation of the two output gears; and
- a plurality of fan bevel gears one connected to each of the blades of the fan, and which are driven by the two output gears of the pitch changing reduction gear, and which cause rotation of the fan blades about their longitudinal axes to vary their pitch.

2. A pitch varying mechanism according to claim 1 and wherein the pitch changing reduction gear comprises a sun gear driven by the output of the epicyclic differential gear, a plurality of planet wheels driven by the sun gear, and a pair of annulus gears which mesh with the planet wheels and which have different numbers of teeth, the difference between the number of teeth on the two annulus gears being equal to the number of planet wheels.

3. A pitch varying mechanism according to claim 2 and in which a sun wheel provides the output of the differential epicyclic gear and carries a gear which acts as the sun gear for the pitch changing reduction gear and which meshes with a gear on each planet wheel which is axially offset from annulus gears associated with the differential gear.

4. A pitch varying mechanism according to claim 3 and wherein each planet wheel is carried in a cage which is of open channel section and made in one piece.

5. A pitch varying mechanism according to claim 1 and wherein the epicyclic differential gear includes two annulus gears, a plurality of planet wheels, two sun wheels and a cage for supporting the planet wheels such that the teeth of alternate planet wheels are axially offset and mesh with different ones of the sun wheels and annulus gears to form two gear trains connected only through the cage.

6. A pitch varying mechanism according to claim 5 and wherein means are provided for holding the annulus gear of one of the gear trains stationary with its corresponding sun wheel being driven by the shaft, the annulus gear of the second gear train being driven by the output from the actuator and its corresponding sun wheel providing the output from the differential gear.

7. A pitch varying mechanism according to claim 1 and wherein the two annulus gears mesh with opposite sides of a gear connected to the root of each fan blade so that relative rotation of the annulus gears rotates the fan blades about their longitudinal axes.

* * * * *